Sept. 29, 1936.　　　L. W. BLAU　　　2,055,476
SEISMIC PROSPECTING
Filed Feb. 26, 1932　　　4 Sheets-Sheet 1
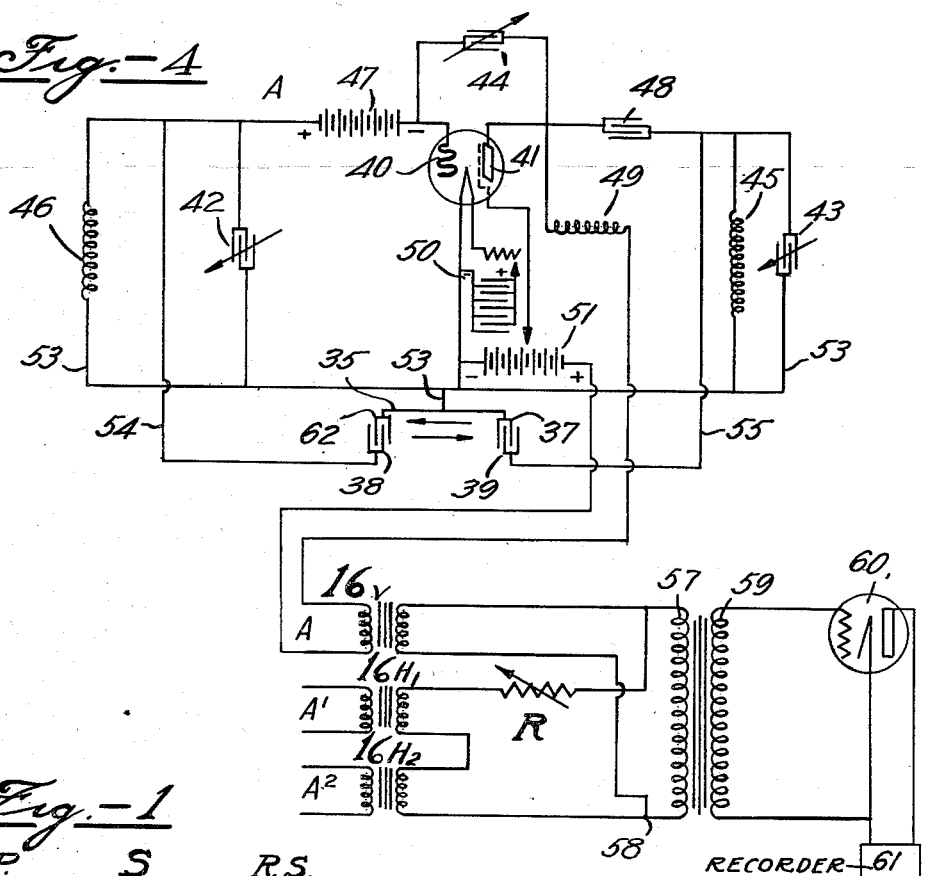
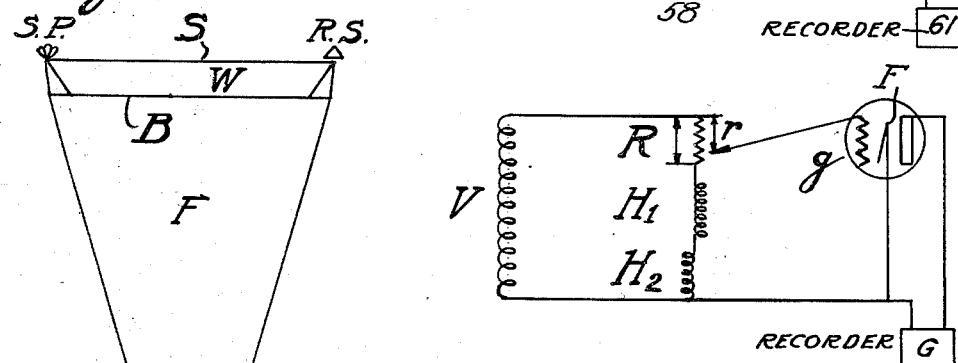
INVENTOR.
Ludwig W. Blau
BY
W. E. Currie ATTORNEY.

Sept. 29, 1936.  L. W. BLAU  2,055,476
SEISMIC PROSPECTING
Filed Feb. 26, 1932  4 Sheets-Sheet 2

Ludwig W. Blau Inventor
By W. F. Weigester Attorney

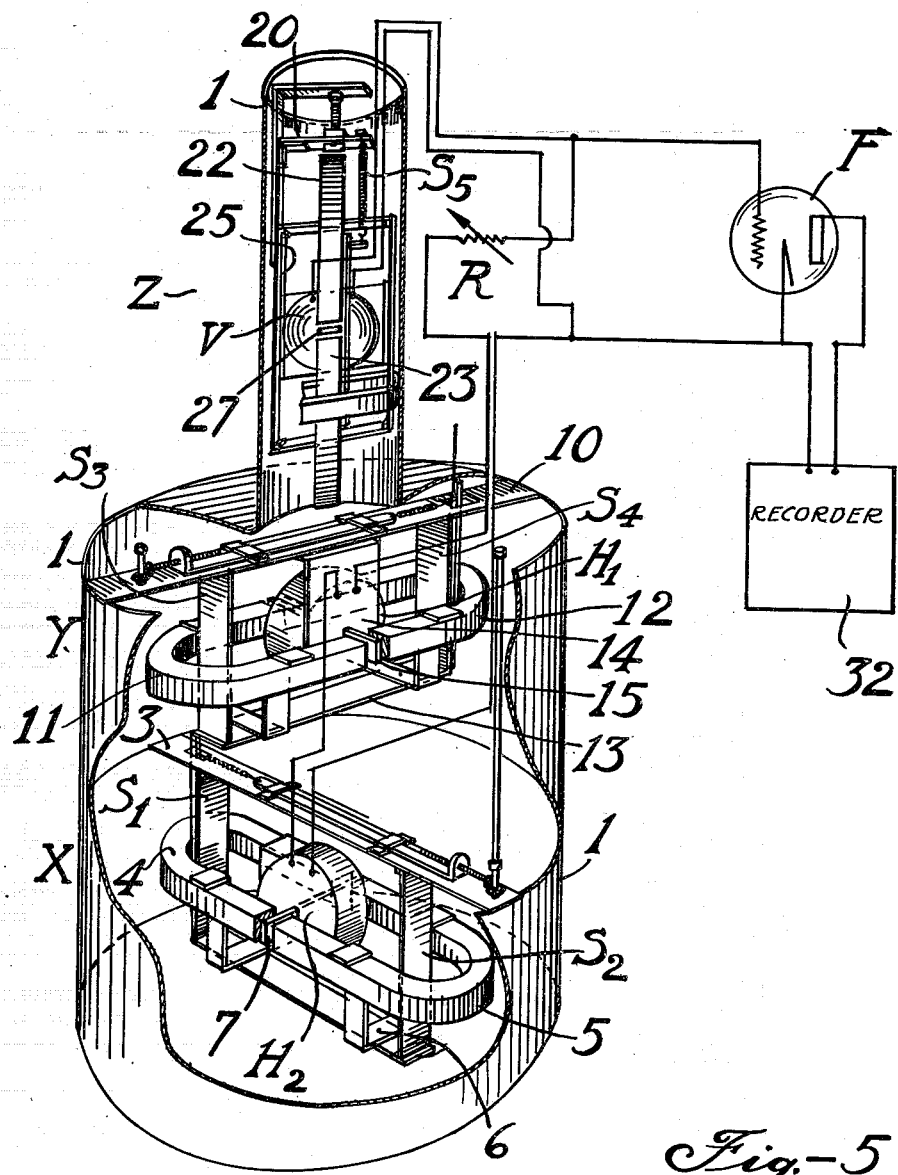

Patented Sept. 29, 1936

2,055,476

UNITED STATES PATENT OFFICE 2,055,476

SEISMIC PROSPECTING

Ludwig W. Blau, Houston, Tex., assignor to Standard Oil Development Company, a corporation of Delaware Application February 26, 1932, Serial No. 595,304

10 Claims. (Cl. 177—352)

This invention relates to improvements in seismic prospecting methods and more specifically to an advantageous method of operating electric seismographs.

The main object of the invention consists in a method whereby differentiation between direct and reflected waves is made possible by cancellation of the horizontal components against the vertical components. Other objects and advantages of the invention will be apparent from the following description when read in conjunction with the drawings, in which—

Figure 2:
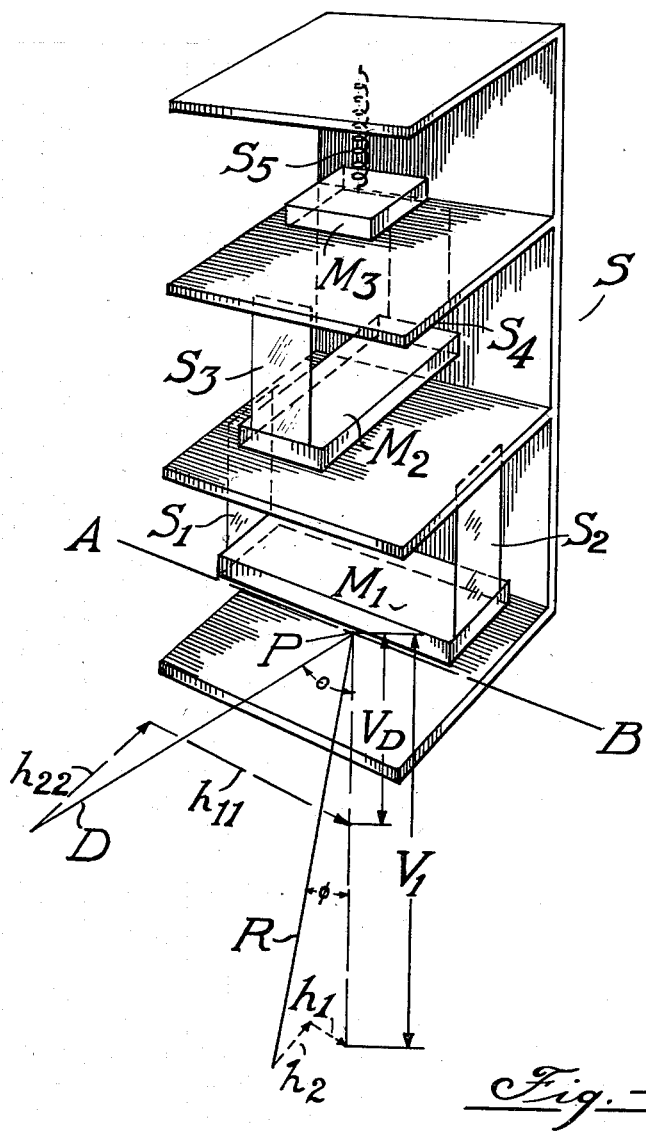
Figure 6:
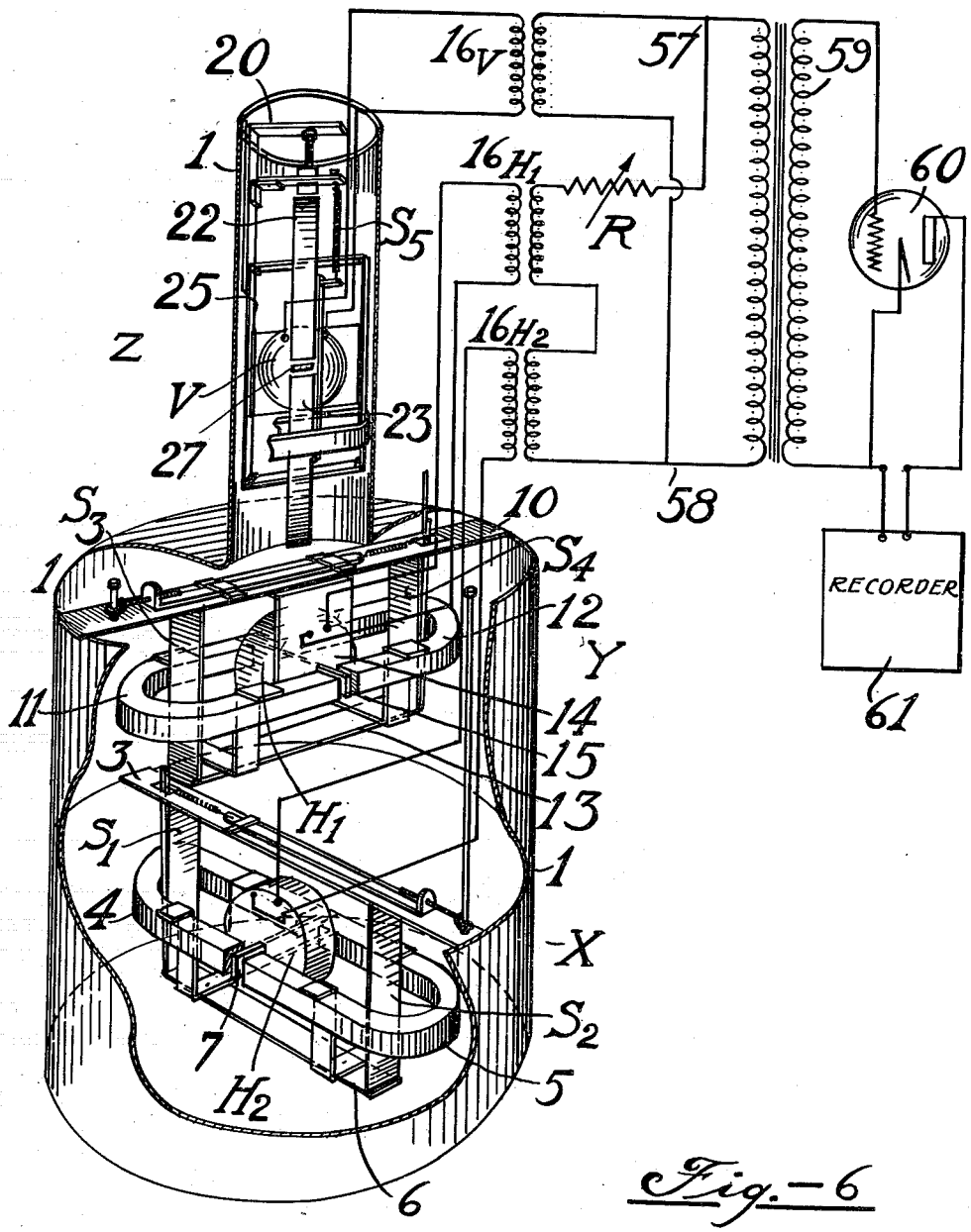

Fig. 1 is a vertical section diagrammatically illustrating the various layers and the travel of the seismic waves therein, Fig. 2 is a perspective view of a three component seismograph, Fig. 3 is a diagrammatic representation of the electric circuit of a three component magneto electric seismograph arranged according to the present invention, Fig. 4 is diagrammatic representation of the electric circuit of a double condenser type of electric seismograph showing the application of the present invention thereto, Fig. 5 is a perspective view with parts broken away of a three component magneto electric seismograph and a schematic representation of an electric circuit for carrying out the invention, and Fig. 6 is a perspective view with parts broken away of a three component magneto electric seismograph and a schematic representation of a modified form of an electric circuit for carrying out the invention.

In seismic prospecting it is customary to explode a charge of dynamite at some point and to place seismographs at certain distances from this point. Experience has shown that a low velocity layer generally overlies the so-called first layer. The low velocity or weathered layer may vary in thickness from a few centimeters to several meters; the velocity of a seismic wave in this layer may be for example 900, 700, 300 or even as low as 125 meters per second while the velocity in the first layer exceeds 1,500 meters and is in most cases about 2,000 meters per second.

Fig. 1 is a vertical section diagrammatically illustrating the various layers and the travel of the seismic waves therein. In this figure the reference letter S P designates the shot point where the charge of dynamite is exploded, R S designates the receiving station where the seismograph is placed, S the surface of the earth, W the weathered or low velocity layer, F the first layer, B the boundary surface between the low velocity and the first layer and D the reflecting layer such as ore deposit, mineral oil deposit, etc. When a charge of dynamite is exploded waves originate; the so-called direct waves travel to the boundary surface B where they are refracted then in the layer F along the boundary surface and finally after a second refraction to the seismograph at R S. The angle which the direct wave makes with the vertical at the point R S is determined by Snell's law. The reflected wave is also refracted at the boundary between the low velocity layer and the first layer; it then proceeds downward until it reaches the boundary between the first layer and the stratum below it (reflecting layer D) where it is reflected back toward the surface to be refracted into the low velocity layer; it reaches the seismograph after traveling through this layer. It is evident from the figure that the reflected wave will arrive at the seismograph after the direct wave; it is apparent that the direction of the reflected wave is more nearly vertical than the direction of the direct wave at the point of arrival R S. This means that the reflected wave has small horizontal components, while the horizontal components of the direct wave are quite appreciable.

Now the direct wave carries as a rule much more energy than the reflected wave. Also, since there is a train of waves the reflected waves generally arrive along with the latter part of the direct wave, rendering the identification of the reflected wave difficult and obliterating in many cases the onset of the reflected wave on the seismogram.

It is the object of this invention to facilitate the identification of the reflected wave and to permit the determination of its time of arrival with greater accuracy. This is accomplished as follows: An electric seismograph such as is illustrated in Fig. 2 capable of reacting to two or all three orthogonal components of the wave is used. The output of the vertical component element of the apparatus is so connected to the output of one or both of the horizontal component elements that the current due to the vertical component element opposes the current due to the horizontal component element or elements. Then there is a significant reduction of the total current and in many cases complete cancellation for waves having large horizontal components (direct waves); on the other hand waves arriving at the seismograph in a nearly vertical direction (reflected waves) have small horizontal components and are therefore recorded with an insignificant reduction in amplitude.

The complete cancellation of the direct waves may be achieved either by magnification of the horizontal components or by the use of electrical resistances as will be described hereinafter.

Before proceeding with a detailed description it should be mentioned that any seismograph, whether electrical, mechanical or otherwise, consists essentially of a frame and of a vibrating mass attached to the frame. The connection between the frame and the vibrating mass is in nearly all cases elastic, that is, it consists of a leaf spring which acts as a hinge and permits the vibration of the mass. The period of the mass is adjusted by means of springs. Whenever the ground upon which the seismograph is standing suffers vibrations, as from a natural or artificial earthquake, the frame of the instrument moves with the ground; the mass, which is for this reason often called the stationary mass, remains at rest. The relative motion or displacement between frame and stationary mass is then utilized for the generation of an electric current in the case of an electric seismograph or is directly recorded, after suitable magnification, in a mechanical seismograph.

The class of electric seismographs includes the following types:

1. Magneto-electric, or induction
2. Single or double condenser
3. Piezo-electric
4. Carbon button
5. Hot-wire.

Condenser seismographs may have either one or two condensers. In the one-condenser instrument, one plate of the condenser is attached to the frame, while the other plate is fastened to the stationary mass. The condenser is then connected into the grid circuit of a vacuum tube. Vibrations of the ground then cause one of the condenser plates to be displaced; they will be alternately closer together and farther apart, thus changing the capacity of the condenser. These changes in capacity are then impressed upon the grid of the tube and cause variations in the plate current which are then amplified and recorded.

In the double-condenser seismograph which is the subject matter of U. S. patent application Serial No. 497,104, Patent No. 2,025,719, of L. W. Blau, A. B. Bryan and W. D. Mounce, filed on November 21, 1930, two condensers are used. One plate of each is connected to the stationary mass, while the other plates are fastened to the frame, or the reverse arrangement can also be used. One of the condensers thus formed is then connected into the grid circuit of a vacuum tube; the second condenser is placed in the plate circuit. If now the frame of the instrument is caused to vibrate, the capacity of one condenser will be increased, while the capacity of the other simultaneously decreases. These opposite changes in the capacities are then impressed upon the grid and plate at the same time, resulting in a change in the plate current. The double-condenser instrument is decidedly more sensitive than the single-condenser instrument.

In order to illustrate my invention, its application to the magneto electric and double condenser types of electric seismographs will be described. Either a two component or a three component apparatus may be used. Advantage taken of the fact that direct waves make a larger angle with the vertical than reflected waves which latter arrive at a seismograph in a nearly vertical direction. The current produced by the horizontal component in the case of a two component apparatus or the sum of currents produced by the two horizontal components in the case of a three component apparatus is combined with the current produced by the vertical component of the seismic wave in such a manner that the difference of the two will be recorded. It is thus possible either to appreciably weaken the indication due to the direct waves or to eliminate the direct waves entirely while the reflected waves, which have only inappreciable horizontal components, will remain practically unaffected. The invention provides, therefore, an easy means of differentiating between the direct and the reflected waves, especially in the case when the former are entirely eliminated so that only the reflected waves are recorded.

Referring particularly to Fig. 2, AB designates the surface of the earth and P designates the point where the seismograph S is set up. We assume a reflected wave R arriving at the point P making an angle of emergence $\phi$ with the vertical at the point P. By the principle of the resolution of forces the wave R can be resolved into the two components $V_1$ and $h_1$, namely the vertical and horizontal components. This simply means that vibrations along the direction R can be considered as being due to horizontal vibrations in the direction of $h_1$ and vertical vibrations in the direction of $V_1$. In the three dimensional case illustrated there is a horizontal component $h_2$ perpendicular to $h_1$.

The seismograph S is a three component instrument with three independent vibrating systems, two of them being constrained to vibrate in horizontal planes perpendicular to each other and the third in the vertical plane through the point P. The lower system comprises a mass $M_1$ suspended by means of flat springs $S_1$ and $S_2$ from the frame of the seismograph S. Mass $M_1$, therefore, can vibrate only parallel to $h_1$, and if the mass $M_1$ is a coil $H_1$ as is illustrated in Fig. 3 and disposed between the poles of a magnet, not shown, electric currents will be induced in the coil $H_1$ proportionally to the velocity of the motion in the direction $h_1$. In the middle section of the seismograph there is another system exactly like the lower one suspended again from the frame by flat springs $S_3$ and $S_4$. The mass $M_2$ of the system is constrained by means of these flat springs $S_3$ and $S_4$ to vibrate in a plane perpendicular to the vibrations of the mass $M_1$. If the mass $M_2$ is a coil $H_2$ as shown in Fig. 3, and is located between the poles of a magnet, not shown, there will be induced currents set up in this coil proportional to the velocity of the horizontal motion perpendicular to $h_1$ or along $h_2$. In the upper compartment of the seismograph there is a helical spring $S_5$ and a mass $M_3$. This system can vibrate in the vertical plane only and if the mass $M_3$ is a coil V as shown in Fig. 3 and located between the poles of a magnet, not shown, there will be induced currents in this coil proportional to the velocity of the motion along $V_1$.

A direct wave D makes an angle $\theta$ with the vertical through the point P. The vertical component of the direct wave D is designated by $V_D$. The horizontal components are designated by $h_{11}$ and $h_{22}$ which are disposed at right angles to each other.

In carrying out the invention in a manner to be later described the energy corresponding to the horizontal components and the vertical component is converted into electric current. The two horizontal components are connected in series. The combined current of the two horizontal components is then opposed to the current from the vertical seismograph which current is proportional to the vertical component of the wave. The amplification is then so adjusted on the horizontal components or on the vertical component that the direct wave which arrives first is cancelled out. This means that the sum of $h_{11}$ and $h_{22}$ is made equal to $V_D$. When the reflected wave arrives a part of its vertical component $V_1$ equal to the sum of $h_1$ and $h_2$ is cancelled out so that the vertical component of the reflected wave is reduced. The reduction is insignificant, however, on account of the fact that the angle of emergence $\phi$ of the reflected wave is very small, perhaps always much smaller than one degree.

In Fig. 3 there is represented schematically the electric circuit of a three component magneto electric seismograph with the application of the present invention to such an apparatus. In this figure V is the coil of the vertical component of the seismograph, $H_1$ is the coil of the horizontal component in the direction parallel with the line from the instrument to the shot point, $H_2$ is the coil of the horizontal component perpendicular to the last mentioned line. The drawings show the coils of the two horizontal components connected in series with each other and with the coil of the vertical component in such a way that the polarities at the ends of coil V are opposite to the polarities at the connected ends of coils $H_1$ and $H_2$. A sliding resistance R serves to adjust the voltage due to V, $H_1$, and $H_2$, so that the voltage drop across $r$ and V is exactly equal to the voltage drop across $R-r$, $H_1$ and $H_2$ for the direct waves. The proper connection of the three coils and the adjustment of the variable resistance in such a way as to eliminate the direct wave can be determined by experimentation and trial. The sliding arm of the resistance R and the point of connection between V and $H_2$ are connected across the grid $g$ and the filament F of a vacuum tube which serves as an amplifying indicator of any difference in voltage between the points with which its elements are connected. When the connection of the three coils and the adjustment of the variable resistance has been effected in such a way that the vacuum tube amplifier does not register the direct waves, this amplifier will only react to the reflected waves, the arrival of which can be exactly determined in this way. It is seen that only one amplifier is necessary for the three component seismograph used in this manner. The elimination of the direct wave is obtained by trial and error. The resistance is set in a given position and a charge is exploded at the shot-point and a record is made of the seismic waves.

The resistance is then changed, another shot is fired and another record is obtained. The position of the resistance is varied until the effect of the direct waves upon the record is entirely canceled out. The reflected waves are received at the recording instruments a few seconds after the direct waves are received. The reflected waves are differentiated from the direct waves by their time of arrival. The position of the resistance is changed until the effect of the direct waves is eliminated on the record. The resistance is adjusted only on the horizontal component. It will be understood that the reflected wave has no horizontal component while the direct wave has a large component. The size of the reflected wave is not reduced on the record while the size of the direct wave is reduced on the record.

The application of my invention to a two component magnetic electric seismograph is analogous to the case of the three component seismograph illustrated in Fig. 3. The only difference is that there is only one horizontal coil either $H_1$ or $H_2$ as the case may be.

Referring particularly to Fig. 5, reference numeral 1 designates the casing of a three component magneto electrical seismograph corresponding to the seismograph diagrammatically shown in Fig. 2. The seismograph comprises a movable system X which includes a supporting frame 3 rigidly carried by the casing 1. A mass corresponding to $M_1$ of Fig. 2 is suspended by means of flat springs $S_1$ and $S_2$ from the supporting frame 3. The relative movement, therefore, of the mass with respect to the casing 1 is only in a single horizontal plane. The mass comprises two spaced horseshoe magnets 4 and 5 which are connected as a unit by means of framework 6. The movable system X includes also an inductance coil $H_2$ which is rigidly fixed to the casing 1 of the instrument. The inductance coil has a core 7 which extends between the magnets. Relative movement between the inductance coil $H_2$ and the magnets 4 and 5 can be effected only by the horizontal components of the waves passing in the direction of $h_1$ and $h_{11}$. Electric current will, therefore, be induced in the inductance coil $H_2$ proportional to the velocity of the motion in the direction $h_1$ and $h_{11}$.

In the middle section of the seismograph there is another vibratory system Y identical in all respects to the vibratory system X, but positioned to be actuated by horizontal components in a direction perpendicular to the components which actuate vibratory system X. The vibratory system Y comprises a supporting frame 10 which is carried rigidly by casing 1. A mass corresponding to mass $M_2$ of Fig. 2 is suspended from the supporting frame 10 by means of the flat springs $S_3$ and $S_4$. The mass includes two horseshoe magnets 11 and 12 supported in spaced relation to each other by means of a frame 13. The frame 13 is secured to the flat springs $S_3$ and $S_4$. An inductance coil $H_1$ is supported rigidly from the frame 10 by means of a bracket 14. The inductance coil $H_1$ is provided with a core 15 which projects between the poles of the magnets 11 and 12. The vibratory system Y is affected by horizontal components of the waves at right angles to those which affect vibratory system X. These components function to set up induced currents in the coil $H_1$ proportional to the velocity of the horizontal motion along $h_2$ and $h_{22}$.

In the upper compartment of the seismograph there is disposed a vibratory system Z which is responsive only to the vertical component of the waves. The vibratory system Z comprises a mass corresponding to the mass $M_3$ of Fig. 2 which is resiliently suspended by means of a helical spring $S_5$. The helical spring $S_5$ is carried by a bracket 20 which is rigidly secured to the casing 1. The mass comprises horseshoe magnets 22 and 23 which are secured as a unit with their poles in spaced relation to each other by means of a supporting frame 25. The supporting frame 25 is secured to the helical spring $S_5$. An inductance coil V is provided with a core 27 which extends between the poles of the magnets 22 and 23. Relative movement of the inductance coil V with respect to the mass $M_3$ can be effected in a vertical plane only and in response to the vertical components of the waves. Consequently, there will be induced currents in the inductance coil V proportional to the velocity of the motion along $V_D$ and $V_R$.

The electrical impulses created by the vibratory systems X, Y, Z, are passed through an electric circuit operative to eliminate direct waves from a mixture of direct and reflected waves by cancellation of the horizontal components against the vertical component. In this electrical circuit the inductance coil V constitutes the input for electrical pulsations corresponding to the vertical component of the waves. Reference numeral 32 designates an oscillograph. The electric circuit connects the input coil V and the oscillograph. A branch is provided in the circuit. The branch includes the inductance $H_2$, the inductance $H_1$ and a sliding resistance R connected in series. The branch is connected across the grid and filament of a vacuum tube F which may be a three electron or screen grid tube. The vacuum tube F is in turn connected to the oscillograph 32 which records the seismogram.

In utilizing the device the inductance coils $H_2$ and $H_1$ which are actuated by the two horizontal components in the waves are connected in series as shown. The combined currents of the inductance coils $H_2$ and $H_1$ are opposed to the current of the inductance coil V responsive to the vertical component of the waves. The amplification is then so adjusted on the horizontal components or the vertical components that the direct wave which arrives first is cancelled out. This means that the sum of $h_{11}$ and $h_{22}$ is made equal to $V_D$. When the reflected wave arrives a part of its vertical component $V_R$ equal to the sum $h_1$ plus $h_2$ is cancelled out so that the vertical component of the reflected wave is reduced. The reduction is insignificant, however, on account of the fact that the angle of emergence $\phi$ of the reflected wave is very small, perhaps always much smaller than one degree.

Fig. 4 is a schematic representation of the electric circuit of a double condenser type of electric seismograph described in the co-pending application Serial No. 497,104, Patent No. 2,025,719, of L. W. Blau, A. B. Bryan and W. D. Mounce. In this figure reference numeral 35 denotes a movably mounted support carrying condenser plates 36 and 37. These are arranged in opposition to rigidly mounted condenser plates 38 and 39. In the double condenser thus formed movement of support 35 either to the right or left results in a corresponding increase or decrease respectively in the capacity of condensers 36, 38 and 37, 39.

In the preferred form of the invention illustrated, the means for indicating the variation of capacity is a vacuum tube (audion) circuit employing a four element tube such as a screen-grid tube. In this the vacuum tube is shown diagrammatically with grid 40 and plate 41. Variable condensers 42 and 43 are in the grid circuit and the plate circuit respectively of the vacuum tube. A variable condenser 44 is in a bridge between the grid and plate circuits. An inductance 45 is arranged in the plate circuit and an inductance 46 in the grid circuit. A grid battery 47 and blocking condenser 48 are supplied as usual. Also the radio frequency choke 49 and output transformer $16_V$ may be of the conventional type. The batteries for operating the vacuum tube are indicated at 50 and 51.

The interior plates 36, 37 of the double condenser are connected by a lead 53 with the vacuum tube circuit and the exterior plates 38, 39 are connected with the plate and grid portions of that circuit by leads 54 and 55, respectively. The support 35 carrying plates 36 and 37 is made of a suitable electrically conductive material.

The double condenser 36 and 37 has one capacity in the grid circuit of the vacuum tube and the other capacity in the plate circuit. Radio-frequency oscillations controlled by the inductance 46 and the condenser 42 are established and maintained in the grid circuit and oscillations are likewise maintained and controlled by the inductance 45 and condenser 43, in the plate circuit of the tube. As long as the capacities of the double condenser remain fixed there is a plate current in the primary of the output transformer $16_V$ which is determined by the constants of the tube, by the inductances and capacities in the grid and plate circuits and by the battery voltages. A change in the capacity of the double condenser causes a variation of the effective capacities in the two circuits and a change in the plate current. This change in plate current is impressed upon the amplifier A by the secondary of the output transformer 16 and is recorded by the receiver.

The reference numeral $16_V$ is the output transformer of the foregoing circuit A which is responsive to the vertical element of the seismograph, $16_{H1}$ is the output transformer of a second electric circuit A' identical in all respects with the circuit above described which gives the horizontal component perpendicular to the line from the instrument to the shot point while $16_{H2}$ is the output transformer of a third electric circuit $A^2$ which gives the horizontal component parallel to the line from the instrument to the shot point. $R_i$ is a variable resistance which is used to adjust the sensitivities; for a proper adjustment such a value of the resistance $R_i$ will be used that the voltage drop across the transformers $16_{H1}$ and $16_{H2}$, in series and across the resistance $R_1$ is equal to the drop across the transformer $16_V$. The connections must, of course, again be made with regard to the polarities and are easily determined by trial. The connecting points 57 and 58 are connected to a transformer 59, the grid and plate type vacuum tube 60 serving as an amplifier. An oscillograph 61 is connected to the plate circuit of the vacuum tube. It is seen that if the voltage drop from point 57 to point 58 through $16_{H2}$, $16_{H1}$, and $R_1$ is equal to the voltage drop from point 58 to point 57 through $16_V$ then there is no resultant voltage impressed upon the grid of the amplifier. This is the adjustment which is necessary to cancel out the direct wave in order to obtain a clear indication of the reflected wave.

If a two component double condenser electric seismograph is used then either $16_{H1}$ or $16_{H2}$ will be absent from the circuit.

Referring particularly to Fig. 6 a magneto electric seismograph is shown identical in all respects with the magneto electric seismograph illustrated in Fig. 5. The electric circuit for cancelling the horizontal components against the vertical component is identical with that illustrated in Fig. 4. The reference numerals used in describing the magneto electric seismograph in this figure are the same as those used in connection with the seismograph in Fig. 5. The reference numerals used in describing the electric circuit in Fig. 6 are the same as those used in describing the corresponding electric circuit in Fig. 4. Referring to Fig. 6 reference numeral 1 designates the casing of a three component magneto electrical seismograph. The seismograph comprises a vibratory system X which includes a supporting frame 3 rigidly carried by the casing 1. The mass is suspended by means of a flat spring $M_1$ and $M_2$ from the supporting frame 3. The relative movement, therefore, of the mass with respect to the casing 1 is only in a single horizontal plane. The mass comprises two spaced horseshoe magnets 4 and 5 which are connected as a unit by means of framework 6. The vibratory system X includes also an inductance coil $H_2$ which is rigidly fixed to the casing 1 of the instrument. The inductance coil has a core 7 which extends between the magnets. Relative movement between the inductance coil $H_2$ and the magnets 4 and 5 can be effected only by the horizontal components of the waves passing in the direction of $h_1$ and $h_{11}$. Electric current will, therefore, be induced in the inductance coil $H_2$ proportionally to the velocity of the motion in the direction $h_1$ and $h_{11}$.

In the middle section of the seismograph there is another vibratory system Y identical in all respects to the vibratory system X by position to be actuated by horizontal in a direct perpendicular to the components which actuate vibratory system X. The vibratory system Y comprises a circuit frame 10 which is carried rigidly by the casing 1. A mass is suspended from the supporting frame 10 by means of the flat springs $S_3$ and $S_4$. The mass includes two horseshoe magnets 11 and 12 supported in spaced relation to each other by means of a frame 13. The frame 13 is secured to the flat springs $S_3$ and $S_4$. An inductance coil $H_1$ is supported rigidly from the frame 10 by means of a bracket 14. The inductance coil $H_1$ is provided with a core 15 which projects between the poles of the magnets 11 and 12. The vibratory system Y is affected by horizontal components of the waves at right angles to those which affect the vibratory system X. These components function to set up induced currents in the coil $H_1$ proportional to the velocity of the horizontal motion along $h_2$ and $h_{22}$.

In the upper compartment of the seismograph is disposed a vibratory system which is responsive only to the vertical component of the waves. The vibratory system Z comprises a mass which is resiliently suspended by means of a helical spring $S_5$. The helical spring $S_5$ is carried by a bracket 20 which is rigidly secured to the casing 1. The mass comprises horseshoe magnets 22 and 23 which are secured as a unit with their poles in spaced relation to each other by means of a supporting frame 25. The supporting frame 25 is secured to the helical spring $S_5$. An inductance coil V is rigidly secured to the casing 1 of the instrument. The inductance coil V is provided with a core 27 which extends between the poles of the magnets 22 and 23. Relative movement of the inductance coil V with respect to the mass can be effected in a vertical plane only and in response to the vertical components of the waves. Consequently, there will be induced currents in the coil V proportional to the velocity of the motion along $V_D$ and $V_R$.

The electric impulses created by the vibratory systems X, Y and Z are passed through an electric circuit operative to eliminate direct waves from a mixture of direct and reflected waves by cancellation of horizontal components against the vertical component. In this circuit the inductance coil V constitutes the in-put for electrical pulsations corresponding to the vertical component of the waves and $16_V$ is the out-put transformer for the inductance coil V. Reference numeral 61 designates an oscillograph. The electric circuit connects the out-put transformer for the inductance coil $H_1$ while $16_{H2}$ is the out-put transformer for the inductance coil $H_2$. R is a variable resistance which is used to adjust the sensitiveness. For a proper adjustment such a valve of the resistance R will be used that the voltage drop across the transformers $16_{H1}$ and $16_{H2}$ in series and across the resistance R is equal to the drop across the transformer $16_V$. The connecting points 57 and 58 are connected to a transformer 59, the grid and plate type vacuum tube 60 serving as an amplifier which in turn is connected to the oscillograph 61.

Having thus described my invention and illustrated by examples, what I claim is:

1. In a seismic measuring system including a source of direct and reflected seismic waves, apparatus for differentiating between a reflected mechanical wave having small horizontal components and a direct mechanical wave having large horizontal components each in comparison with their vertical component, which comprises means for separately transforming the vertical and horizontal components of the waves into electric currents, means for adjusting the amplitude of the horizontal components against the vertical, and means for opposing the electric current of the horizontal components against the current of the vertical component whereby the total current is greatly reduced for direct waves and the current for reflected waves is substantially unaffected.

2. In a seismic measuring system including a source of direct and reflected seismic waves, apparatus for differentiating between a reflected mechanical wave having small horizontal components as compared with its vertical component and a direct mechanical wave having large horizontal components as compared with its vertical component, which comprises means for separately transforming the vertical and at least one of the horizontal components of the waves into electric currents, means for adjusting the amplitude of the horizontal components against the vertical, and means for opposing the electric current of the horizontal components with suitable resistance against the current of the vertical component whereby the total current is cancelled for direct waves and the current for reflected waves is substantially unaffected.

3. In a seismic measuring system including a source of direct and reflected waves, apparatus for differentiating between a reflected mechanical wave having small horizontal components as compared with its vertical component and a direct mechanical wave having large horizontal components as compared with its vertical component, which comprises means for separately causing the vertical and horizontal components to actuate vibrating systems, separately transforming the vibrations into electric current, means for combining the currents of the horizontal components of the direct wave, means for adjusting the amplitude of the horizontal components against the vertical, means for opposing the combined currents against the vertical current of the direct wave with sufficient resistance whereby the total current for the direct wave is substantially cancelled, and means for recording the vertical component of the reflected wave.

4. In a seismic measuring system including a source of direct and reflected waves, apparatus for differentiating between a reflected mechanical wave having small horizontal components as compared with its vertical component and a direct mechanical wave having large horizontal components in comparison with its vertical component, which comprises means for separately transforming the vertical and horizontal components of the waves into electric currents, means for amplifying the sum of the currents corresponding to the horizontal components for the direct wave, means for adjusting the amplification between the vertical and horizontal components whereby the current corresponding to the vertical component of the direct wave cancels the current corresponding to the horizontal component of the direct wave, and means for recording the vertical component of the reflected wave.

5. Apparatus for eliminating direct waves from a mixture of direct and reflected seismic waves, which comprises means for producing pulsations of electric energy corresponding only to the vertical component of the waves, and means for producing pulsations of electric energy corresponding only to the horizontal components of the waves, means for adjusting the amplitude of the pulsations, and means for opposing the pulsations corresponding to the horizontal components against the pulsations corresponding to the vertical component whereby the pulsations corresponding to the horizontal components are cancelled against the pulsations corresponding to the vertical component and the remaining pulsations corresponding to the vertical component are passed.

6. Apparatus for eliminating direct waves from a mixture of direct and reflected seismic waves, which comprises means for producing pulsations of electric energy corresponding only to the vertical component of the waves, and means for producing pulsations of electric energy corresponding only to the horizontal components of the waves, an electric circuit connected to the first mentioned means, the electric circuit having a branch, the branch including a resistance connected in series to the second mentioned means whereby the pulsations of the horizontal components are opposed to and cancelled out against the pulsations of the vertical component and the remaining pulsations corresponding to the vertical component are passed.

7. Apparatus for eliminating direct waves from a mixture of direct and reflected seismic waves, which comprises means for producing pulsations of electric energy corresponding only to the vertical component of the waves, and means for producing pulsations of electric energy corresponding only to one of the horizontal components of the waves, an electric circuit connected to the first mentioned means, the electric circuit having a branch, the branch including a variable resistance connected in series to the second mentioned means whereby the pulsations corresponding to the horizontal component are opposed to and cancelled out against the pulsations corresponding to the vertical components and the remaining pulsations corresponding to the vertical component are passed.

8. Apparatus for eliminating direct waves from a mixture of direct and reflected seismic waves, which comprises means for producing pulsations of electric energy corresponding to the vertical component of the waves, and means for producing pulsations of electric energy corresponding only to the horizontal components of the waves, an output transformer, an electric circuit including the first mentioned means and the primary of the transformer, a branch in the circuit, the branch including a resistance connected in series to the second mentioned means whereby the pulsations corresponding to the horizontal components are opposed to and cancelled out against the pulsations corresponding to the vertical component and the remaining pulsations corresponding to the vertical component are passed.

9. Apparatus for eliminating direct waves from reflected waves, which comprises means for opposing the sum of the horizontal components against the vertical component whereby the direct waves are eliminated and the reflected waves are passed.

10. Apparatus for eliminating direct waves from reflected waves, which comprises means for opposing one of the horizontal components against the vertical component of the waves whereby the direct waves are eliminated and the reflected waves are passed.

LUDWIG W. BLAU.